US011426661B2

(12) United States Patent
Wan et al.

(10) Patent No.: US 11,426,661 B2
(45) Date of Patent: Aug. 30, 2022

(54) VIRTUAL RESOURCE PROCESSING METHOD IN GAME SCENE AND APPARATUS, TERMINAL, AND STORAGE-MEDIUM

(71) Applicant: NETEASE (HANGZHOU) NETWORK CO., LTD., Zhejiang (CN)

(72) Inventors: Changkun Wan, Zhejiang (CN); Chuanbei Wu, Zhejiang (CN); Jiazhen Chen, Zhejiang (CN); Qingxin Zheng, Zhejiang (CN); Haohua He, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 83 days.

(21) Appl. No.: 16/959,150

(22) PCT Filed: Nov. 21, 2018

(86) PCT No.: PCT/CN2018/116747
§ 371 (c)(1),
(2) Date: Jun. 30, 2020

(87) PCT Pub. No.: WO2019/148941
PCT Pub. Date: Aug. 8, 2019

(65) Prior Publication Data

US 2020/0353357 A1 Nov. 12, 2020

(30) Foreign Application Priority Data

Jan. 30, 2018 (CN) ......................... 201810091365.8

(51) Int. Cl.
*A63F 13/52* (2014.01)
*A63F 13/577* (2014.01)
(Continued)

(52) U.S. Cl.
CPC ........ *A63F 13/577* (2014.09); *A63F 13/2145* (2014.09); *A63F 13/52* (2014.09);
(Continued)

(58) Field of Classification Search
CPC ........ A63F 13/52; A63F 13/57; A63F 13/577; A63F 13/837; A63F 2300/308; A63F 2300/643; G06T 19/00
See application file for complete search history.

(56) References Cited

U.S. PATENT DOCUMENTS

2006/0246968 A1 11/2006 Ltd
2007/0218966 A1 9/2007 Corp

FOREIGN PATENT DOCUMENTS

CN 105378785 A 3/2016
CN 105935493 A 9/2016
(Continued)

OTHER PUBLICATIONS

"Wikipedia Spycraft". From Wikipedia, The Free Encyclopedia. [online], [retrieved on Dec. 17, 21], Retrieved from the Internet <URL: https://en.wikipedia.org/w/index.php?title=StarCraft&oldid=819565127>. 23 pages.*
(Continued)

*Primary Examiner* — Lawrence S Galka
(74) *Attorney, Agent, or Firm* — Gang Yu

(57) ABSTRACT

A virtual resource processing method and apparatus in a game scene, a terminal, and a storage medium are disclosed. The method includes: in response to a disassembly instruction, detecting whether the virtual resource is attacked by a virtual character; when detecting that the virtual resource is attacked by the virtual character, determining the virtual resource attacked by the virtual character as a first virtual resource to be disassembled; and when the first virtual resource to be disassembled satisfies a preset condition
(Continued)

removing, the first virtual resource to be disassembled from the game scene. A processing apparatus, a mobile terminal and a computer storage medium are also disclosed. The present disclosure provides a novel user interaction mode. A user may conveniently achieve attacking and removing of a virtual resource in a game scene. The number of interactions between the user and an interaction interface is reduced. The user experience is improved.

19 Claims, 7 Drawing Sheets

(51) Int. Cl.

| | |
|---|---|
| ***A63F 13/2145*** | (2014.01) |
| ***A63F 13/533*** | (2014.01) |
| *A63F 13/837* | (2014.01) |
| *G06F 3/0488* | (2022.01) |

(52) U.S. Cl.
CPC .......... *A63F 13/533* (2014.09); *A63F 13/837* (2014.09); *A63F 2300/1075* (2013.01); *A63F 2300/308* (2013.01); *A63F 2300/643* (2013.01); *G06F 3/0488* (2013.01)

(56) References Cited

FOREIGN PATENT DOCUMENTS

| | | |
|---|---|---|
| GN | 101605583 A | 12/2009 |
| GN | 108434734 A | 8/2018 |

OTHER PUBLICATIONS

“Spycraft Manual”, [dated 1998], [online], [retrieved Dec. 17, 21], Retrieved from the Internet <URL:http://www.replacementdocs.com/download.php?view.6599>. 15 pages.*

* cited by examiner

VIRTUAL RESOURCE PROCESSING METHOD IN GAME SCENE AND APPARATUS, TERMINAL, AND STORAGE-MEDIUM

CROSS-REFERENCE TO RELATED APPLICATIONS

The present application claims benefit of Chinese Patent Application No. 201810091365.8, filed to the China Patent Office on Jan. 30, 2018, entitled "Virtual Resource Processing Method in Game Scene and Apparatus, Terminal, and Storage-Medium", the contents of which are hereby incorporated by reference in its entirety.

TECHNICAL FIELD

The present disclosure relates to the technical field of games, and in particular to a virtual resource processing method in game scene and apparatus, terminal, and storage-medium.

BACKGROUND

Under the wave of the Internet, the continuous development and evolution of hardware and software technologies has promoted the emergence of terminals and software. At the same time, a large number of mobile games with different themes emerged to meet the needs of players.

A game application running on terminal currently has a variety of different themes and game play types, and the combination of a variety of different game plays to improve the playability of games is currently the development direction of the field. For example, a shoot type game and a building type game are combined, and a strategy type game and a parkour type game are combined.

SUMMARY

The objective of the present disclosure is to provide a virtual resource processing method in game scene and apparatus, terminal, and storage-medium, which overcome, to some extent, at least, one or more problems due to limitations and disadvantages of the related art.

According to one embodiment of the present disclosure, a virtual resource processing method in game scene is provided, which may include the following steps:

In response to a disassembly instruction, it is detected whether the virtual resource is attacked by a virtual object.

In response to detecting that the virtual resource is attacked by the virtual character, determining the virtual resource attacked by the virtual character as a first virtual resource to be disassembled; and In response to the first virtual resource to be disassembled, satisfying a preset condition, removing the first virtual resource to be disassembled from the game scene.

According to another embodiment of the present disclosure, a virtual resource processing apparatus in a game scene is provided, which may include: a response module, configured to detect, in response to a disassembly instruction, whether the virtual resource is attacked by a virtual character; a determination module, configured to determine, when it is detected that the virtual resource is attacked by the virtual character, the virtual resource by the virtual character as a first virtual resource to be disassembled; and a control module, configured to remove, when the first virtual resource to be disassembled satisfies a preset condition, the first virtual resource to be disassembled from the game scene.

According to another embodiment of the present disclosure, a mobile terminal is also provided, which may include: a processor; and a memory, configured to store an executable instruction of the processor, wherein the processor is configured to perform the processing method according to any one of the above by executing the executable instruction.

According to another embodiment of the present disclosure, a non-transitory storage medium is also provided. A computer program may be executed by a processor to implement the processing method according to any one of the above.

BRIEF DESCRIPTION OF THE DRAWINGS

The above and other features and advantages of the present disclosure will become more apparent from the detailed description of exemplary embodiments with reference to the drawings. It is apparent that the drawings in the following description are only some embodiments of the present disclosure, and other drawings can be obtained from those skilled in the art according to these drawings without any creative work. In the drawings.

DETAILED DESCRIPTION OF THE EMBODIMENTS

Figure 1:
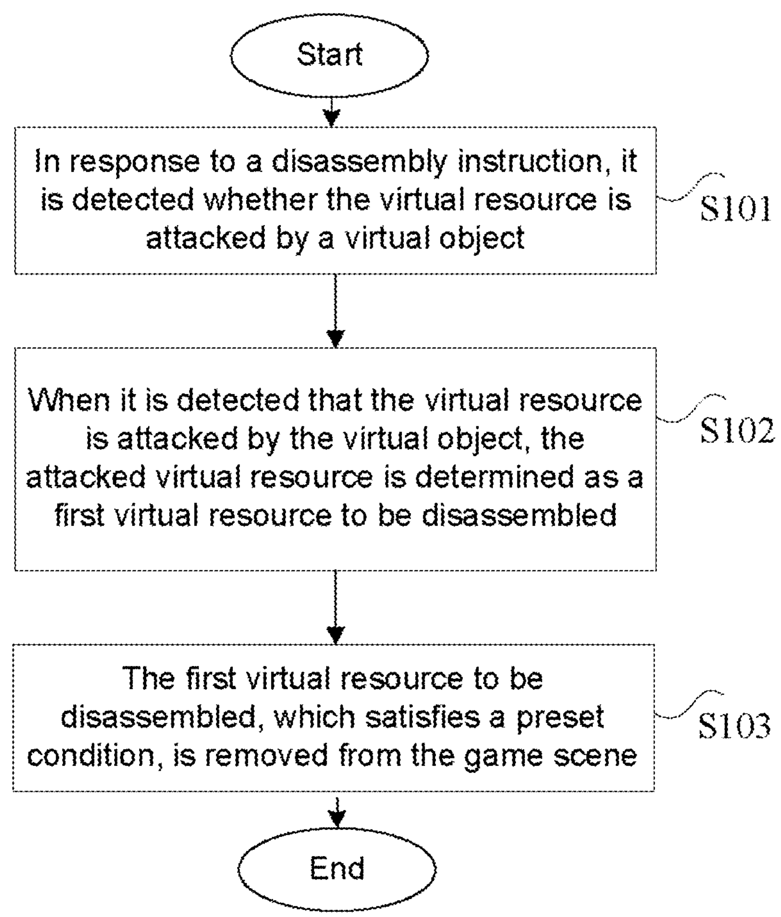
FIG. 1 illustrates a flowchart of a virtual resource processing method in a game scene according to an embodiment of the present disclosure.

It is to be noted that in the case of no conflict, the features in the embodiments and the embodiments in the present application may be combined with each other. The disclosure is described below with reference to the drawings and in conjunction with the embodiments in detail.

In order to make those skilled in the art better understand the solutions of the present disclosure, the technical solutions in the embodiments of the present disclosure will be clearly and completely described below with reference to the drawings in the embodiments of the present disclosure. It is apparent that the described embodiments are only a part of the embodiments of the present disclosure, not all of the embodiments. On the basis of the embodiments of the present disclosure, all other embodiments obtained on the premise of no creative work of those of ordinary skill in the art should fall within the scope of protection of the present disclosure.

It is to be noted that the specification and claims of the disclosure and the terms "first", "second" and the like in the drawings are used to distinguish similar objects, and do not need to describe a specific sequence or a precedence order. It will be appreciated that data used in such a way may be exchanged under appropriate conditions, in order that the embodiments of the disclosure described here can be implemented. In addition, terms "include" and "have" and any variations thereof are intended to cover non-exclusive inclusions. For example, it is not limited for processes, methods, systems, products or devices containing a series of steps or units to clearly list those steps or units, and other steps or units which are not clearly listed or are inherent to these processes, methods, products or devices may be included instead.

It is also to be noted that various triggering events disclosed in the present specification may be preset, and may also be set in real time according to operating instructions of users in a program running process. Different triggering events may trigger to execute different functions.

For a mobile terminal running mobile game, a user usually manipulates the game by the thumbs of both hands. Under the restriction of hardware conditions, such as a smaller terminal display, less manipulation dimensions and lower processor computing power, the manipulation smoothness of the mobile game cannot achieve that of a PC-side game. For example, in the game of disassembly, in general, a player needs to interact with both hands to select a disassembled object, and then triggers a determination operation to complete final object rendering. This type of interaction limits the gaming experience of the players, especially for heavily manipulated games, where it is difficult for the players to achieve the orientation selection and disassembly of a model to be disassembled in a very short period of time.

FIG. 1 is a virtual resource processing method in a game scene described and disclosed according to an embodiment. In the present implementation manner, a processing method 100 for a virtual resource in a game scene is illustrated by different examples. The processing method for a virtual resource in a game scene provided in the present implementation manner is performed on a mobile terminal. The mobile terminal may be any terminal device such as a computer, a tablet computer, or an electronic device. A software application is executed on a processor of the mobile terminal, a GUI is obtained by rendering on a touch display of the mobile terminal, the content displayed by the GUI at least partially includes a local or global game scene, and the game scene includes a game image and at least one virtual character 10.

The game image may include a virtual resource 20 relatively fixed in position, such as ground, mountains, stones, flowers, grass, trees, or buildings. It is to be noted that the virtual resource 20 in the present application includes at least one sub-model, that is, at least on sub-model constitutes the virtual resource 20 and the virtual resource 20 may be each virtual object in the game scene, such as the ground, mountains, stones, flowers, grass, trees, or buildings mentioned above. The sub-model is a basic unit constituting each virtual object. For example, when the virtual resource 20 is a house model, the sub-model is a wall model, a roof model, or the like constituting the house. The virtual resource 20 is divided into a dynamic virtual resource and a static virtual resource. The dynamic virtual resource refers to a virtual resource 20 that may respond to a control instruction input by a user through the mobile terminal. Further, the dynamic virtual resource is divided into a reconfigurable virtual resource. and a non-reconfigurable virtual resource. The reconfigurable virtual resource means that the virtual resource can be attacked or can be associated with the newly generated virtual resource 20. For example, the reconfigurable virtual resource is a building such as a house. When it is attacked, it may be damaged or even disappeared. A new building may be built on the basis of the house, wherein the association relationship is that the associated virtual resources 20 may affect the state changes thereof. Specifically, when a new building is built on a reconfigurable virtual resource, such as a house, the new building will be associated with the house. When the house is attacked to be disassembled, the new building associated with the house will be disassembled together. The non-reconfigurable virtual resource means that a physical relationship with the newly generated virtual resource 20 may be established. For example, the non-reconfigurable virtual resource is a road, a bridge, a terrain, etc., and new buildings may be built and physically supported on these non-reconfigurable virtual resources. The static virtual resource refers to a virtual resource 20 that cannot respond to the control instruction input by the user through the mobile terminal, such as grass, shrubs and water in the game image.

The virtual character 10 may be a virtual character 10 of an enemy camp, or may be a virtual character 10 of an own camp. The virtual character 10 may perform corresponding actions in the game scene in response to an operation of a user. For example, the user may control the virtual character 10 to walk, run, squat, bend, attack, shoot, etc. in the game scene. The present disclosure is not limited herein.

A virtual resource processing method in a game scene provided in the present implementation manner includes the following steps.

At step S101, in response to a disassembly instruction, it is detected whether a virtual resource 20 is attacked by a virtual object 10.

At step S102, when it is detected that the virtual resource 20 is attacked by the virtual object 10, the virtual resource 20 attacked by the virtual character is determined as a first virtual resource 30 to be disassembled.

At step S103, the first virtual resource 30 to be disassembled, which satisfies a preset condition, is removed from the game scene.

By the above implementation manner, in response to a disassembly instruction input by a user, the virtual resource 20 in a game scene is attacked. When it is detected that the virtual resource 20 is attacked, it is determined that the virtual resource 20 is the first virtual resource 30 to be disassembled. When the first virtual resource 30 to be disassembled satisfies a preset condition, the first virtual resource 30 to be disassembled is removed from the game scene. By means of the above implementation manner, a novel user interaction mode is provided. A user may conveniently achieve attacking and removing of the virtual resource 20 in the game scene. The number of interactions between the user and an interaction interface is reduced. The user experience is improved.

Each step of the virtual resource processing method in a game scene in the present exemplary embodiment will be further described below.

In the present exemplary embodiment, some or all of game scene basic units of a game are displayed in a GUI of a touch screen of a mobile terminal, such as game images, character or image effects, human-computer interaction prompts, and virtual buttons for interaction. The GUI of the mobile terminal controls these game scene basic units to make a corresponding output by receiving an input touch operation input by the user for basic units in these game scenes. For example, when receiving a "shoot" input by the user, the mobile terminal controls a weapon 50 in the GUI to make an output of a "shooting action".

The respective steps in the present embodiment may be performed simultaneously with each other or sequentially. The respective steps in the present embodiment may be subsequently and automatically performed after being triggered, or special steps may be performed according to a user-specific input operation.

At step S101, in response to a disassembly instruction, detecting whether the virtual resource 20 is attacked by a virtual character 10.

Figure 4:
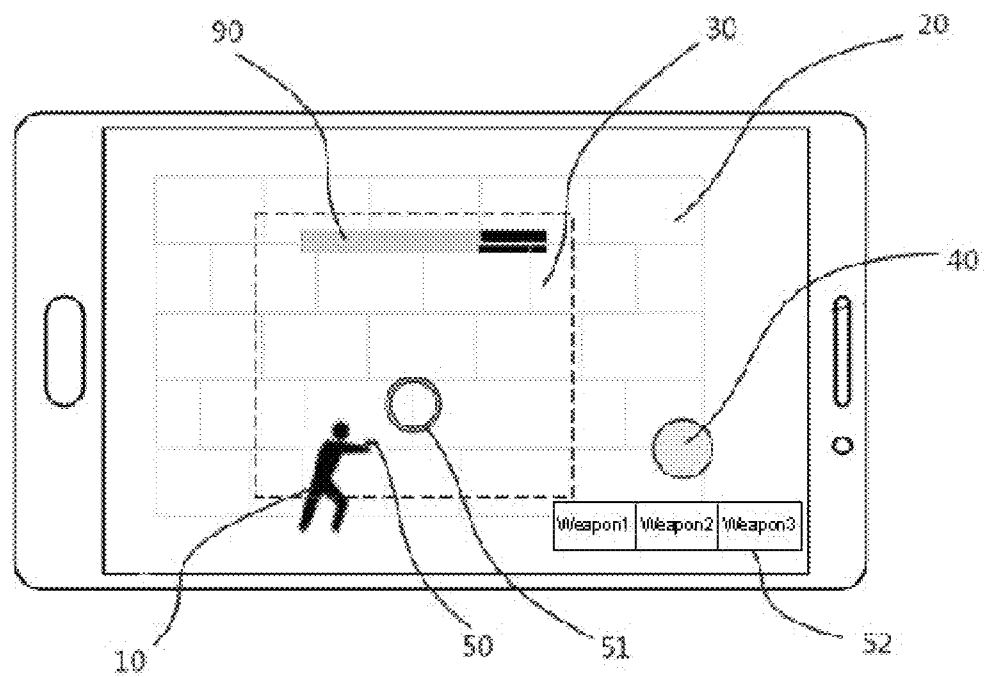
FIG. 4 illustrates a schematic diagram of a GUI according to an embodiment of the present disclosure.

As shown in FIG. 4, the disassembly instruction is a trigger instruction that controls the virtual character to attack the virtual resource 20 in the game scene. As mentioned above, the virtual resource 20 is divided into a dynamic virtual resource and a static virtual resource. Further, the dynamic virtual resource is divided into a reconfigurable virtual resource, and a non-reconfigurable virtual resource.

In the present embodiment, a step of responding to a disassembly instruction includes: in response to a touch operation on a preset disassembly instruction control 40 on a GUI, the preset disassembly instruction control 40 allowing the user to control, according to the received touch operation of the user, the virtual character 10 to attack the virtual resource 20.

The preset disassembly instruction control 40 in the GUI is arranged at a display edge. In the present implementation manner, the preset disassembly instruction control 40 is arranged at a lower edge of the display interface. In other implementation manners, the preset disassembly instruction control 40 may be arranged at a left edge or a right edge. In other implementation manners, the preset disassembly instruction control 40 may be arranged at other positions according to a custom operation of the user. The preset disassembly instruction control 40 has a significant characteristic parameter, which is used to facilitate the user to quickly locate the position of the preset disassembly instruction control 40. In the present implementation manner, the significant characteristic parameter is different from other virtual control shape parameters. In other implementation manners, the significant feature parameter may be a flicker parameter and/or a color parameter or the like that is different from other virtual controls.

In the present implementation manner, in step S101, the step of responding to a touch operation of a user on a preset disassembly instruction control 40 on a GUI includes: an open gesture for a preset starting disassembly mode is set on a game setting interface, it is determined that an input operation of the open gesture is received, and the virtual character is controlled to disassemble the virtual resource 20 in the game scene. A receiving area of the open gesture may be a preset area or a blank area of the GUI, where the blank area is an area of the game interface that does not include other virtual spaces. In the present implementation manner, when it is detected that the virtual character is in a disassembly mode, the preset disassembly instruction control 40 is controlled to be displayed on a user interface. In the present implementation manner, the manner of displaying the preset disassembly instruction control 40 may be: displaying an icon in the blank area of the user interface, where the icon is configured to enable the user to control the virtual character 10 to attack the virtual resource 20 by receiving the touch operation of the user. In other implementation manners, the manner of displaying the preset disassembly instruction control 40 may be: replacing an icon at other positions of the user interface with an icon for enabling the user to control the virtual character 10 to attack the virtual resource 20 by receiving the touch operation of the user.

In other implementation manners, in step S101, the step of responding to a disassembly instruction includes: a physical button of the mobile terminal is associated with the disassembly instruction, and when the mobile terminal detects that the physical button is pressed, the virtual character 10 is controlled to attack the virtual resource 20. In other implementation manners, the virtual character 10 is controlled to attack the virtual resource 20 by a preset audio instruction.

By the above implementation manner, the user can clearly and quickly determine the preset disassembly instruction control 40 to control the virtual character 10 to attack the virtual resource 20, thereby facilitating user operations and improving the user experience.

In the present implementation manner, the step of responding to a disassembly instruction further includes: converting an aim point form according to the disassembly instruction. Specifically, the aim point form is a visual representation of an aim point 51, such as shape, color, or size of the aim point 51. Changing the aim point form refers to changing the aim point 51 from a first aim point form to a second aim point form. Specifically, it may be implemented by means of image replacement, or may be implemented by other means, which is not specifically limited by the present implementation manner. The step of changing an aim point form according to the disassembly instruction may include the following composition steps.

At step 1, determining that the virtual character uses a preset type of weapon 50, wherein the preset type of weapon 50 may be a close-in weapon 50, and the content specific to the weapon type is described below.

At step 2, acquiring the orientation of a virtual camera, and acquiring the virtual resource 20 corresponding to the orientation of the virtual camera within a preset range of the virtual character.

At step 3, the corresponding virtual resource 20 is determined as a preset type of virtual resource 20. In the present implementation manner, the preset type of virtual resource 20 is a reconfigurable virtual resource. In the present implementation manner, the reconfigurable virtual resource may respond to a disassembly behavior of the virtual character, where the disassembly behavior may be an attacking behavior, a shooting behavior, or a repairing behavior, a construction behavior, and the like for the reconfigurable virtual resource. In other implementation manners, the preset type of virtual resource 20 is a reconfigurable virtual resource or other types of virtual resources 20.

At step 4, the aim point 51 is controlled to be converted from the form to the second aim point form. In the present implementation manner, different second aim point forms are determined according to different weapons 50 or different types of virtual resources 20.

By the above implementation manner, the weapon 50 currently used by the virtual character and the facing virtual resource 20 are detected, and the user is prompted by changing the aim point 51 on the display interface, thereby improving the user operation experience.

In the present implementation manner, the step of detecting whether the virtual resource 20 is attacked by the virtual character 10 further includes:

At step S1011, a weapon type of a weapon currently used by the virtual object 10 is acquired.

At step S1012, a preset detection method corresponding to the weapon type is acquired according to the weapon type, and it is detected whether the virtual resource 20 is attacked by the virtual object 10 according to the preset detection method.

By the above implementation manner, different preset detection methods are called according to the type of the weapon 50 used by the virtual character to detect whether the weapon 50 used by the virtual character effectively attacks the virtual resource 20, so that the system resource expenditure can be effectively saved. In the game world, different virtual resources 20 have different physical models. In the above implementation manner, a more suitable preset detection method is called according to different physical models to improve the judgment efficiency of the relationship between the virtual resources 20. Meanwhile, the probability of occurrence of wasted system resources caused by unsuitable judgment methods is reduced.

Each step in the present exemplary embodiment will be further described below.

At step S1011, a weapon type currently used by the virtual object 10 is acquired.

Specifically, the virtual character may obtain different weapons 50 by purchasing or picking up, a weapon control 52 is provided on the user interface, and the weapon control 52 is used for displaying and receiving the touch operation of the user to control the virtual character to use the weapon 50 corresponding to the weapon control 52, where the number of weapon controls 52 may be the same as the number of weapons possessed by the virtual character, or may be other numbers, the weapon control 52 may be in one-to-one association with the weapon 50, or may be in many-to-one association with the weapon 50. The weapon 50 corresponding to the weapon 50 icon that is triggered is acquired to determine the weapon type currently used by the virtual character.

At step S1012, a preset detection method corresponding to the weapon type is acquired according to the weapon type, and it is detected whether the virtual resource 20 is attacked by the virtual object 10 according to the preset detection method.

Specifically, the preset detection method is used to detect whether the weapon 50 currently used by the virtual character and the virtual resource 20 physically collide.

In the present implementation manner, the preset detection method includes at least one of the following: when the weapon type is a remote weapon 50, the preset detection method is a first detection method. The first detection method is to emit a ray to the game scene from a preset position of the GUI according to the current orientation of the virtual character, wherein the preset position may be an aim point position or an arbitrary position of the GUI, the ray may be a non-visible ray or may also be a visible ray, and the ray is used to detect the virtual resource 20 that collides on a path.

When the weapon type is a close-in weapon 50, the preset detection method is a second detection method. The second detection method is to provide a virtual resource bounding box and a weapon bounding box for the virtual resource 20 within the preset range in the game scene and the weapon 50 currently used by the virtual character to detect whether the virtual resource bounding box and the weapon bounding box intersect. In the present implementation manner, the preset range may be all virtual resources 20 in the game scene. In other implementation manners, within the preset range, the corresponding virtual resource 20 is acquired according to the information by acquiring the position and direction of the virtual character. By such an implementation manner, the data computation load can be effectively reduced, and the processing efficiency can be improved.

Figure 5:
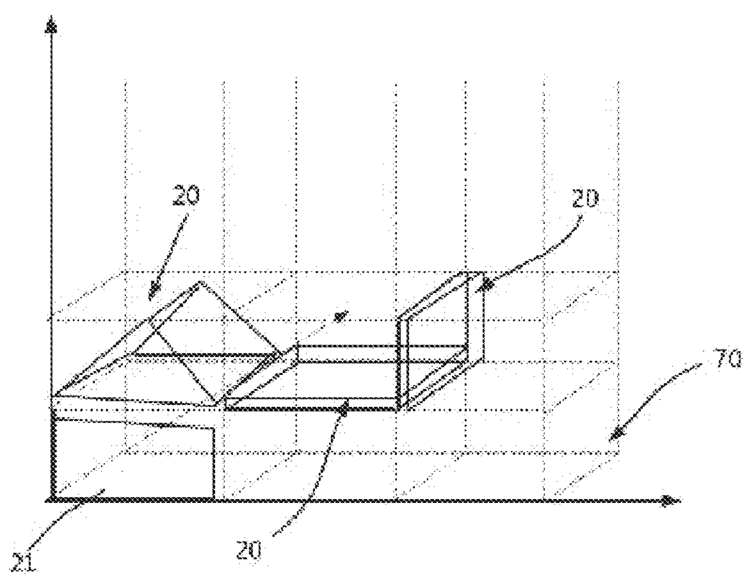
FIG. 5 illustrates a schematic diagram of providing a virtual resource in a game scene constituted by geometries according to an embodiment of the present disclosure.

As shown in FIG. 5, the space of the game scene is divided into multiple a plurality of interconnected virtual geometries 70. The geometries 70 are virtual blocks defined by a coordinate system for constituting a space of the entire game scene, and each of the geometries 70 has corresponding coordinate value information. The geometry 70 may be a rectangular parallelepiped, a cube, a parallelepiped, a honeycomb, etc. It can be understood that the geometries 70 may be spliced together to form a space for the entire game scene.

In the present embodiment, the geometries 70 are a rectangular parallelepiped with the same length and width. A coordinate system XYZ is established in the space of the game scene, which is horizontal XZ coordinates and a vertical upward coordinate Y, respectively. The way of spatial division refers to dividing the space into an infinite number of rectangular parallelepipeds with intervals of X=5 m, Z=5 m and vertical upward Y=3.5 m. The virtual resource 20 in the game scene is arranged within the surface range of the geometry 70, wherein the surface includes an outer surface and an inner section of the geometry 70. The virtual resource 20 includes different types of sub-models 21, such as a vertical model, a horizontal model, an inclination model and a cylindrical model.

The virtual resource 20 in the game scene includes at least one sub-model 21. The sub-model 21 is built on at least one of surfaces of the interconnected virtual geometries 70 or t at least one of inner sections of the interconnected virtual geometries 70. For example, when the virtual resource 20 is a sub-model 21 of a vertical model (or other types of sub-models 21), the virtual resource 20 is built and located on the surface in a certain vertical direction of a geometry 70. When the virtual resource 20 includes multiple sub-models 21 (e.g., a vertical model, a horizontal model and an inclination model), the virtual resource 20 may be built and located on the surface and inner section of the multiple geometries 70. For example, a vertical model is built on the surface in a vertical direction of a first geometry, a horizontal model is built on the bottom surface of a second geometry adjacent to the first geometry, and an inclination model is built on the inner section of the second geometry. For example, FIG. 5 includes six interconnected geometries 70, and houses, horizontal boards, and vertical boards arranged on the surfaces of different geometries 70. Due to the art needs during construction, various sub-models 21, the horizontal boards and the vertical boards that constitute the house are not connected.

Through the above implementation manners, on the one hand, the building built by the virtual character 10 and the original building in the game scene can be aligned and spliced; and on the other hand, physical collision detection between the buildings during building in the game scene is avoided, so that the system overhead can be effectively reduced, and the smooth running of the game can be improved.

Figure 6:
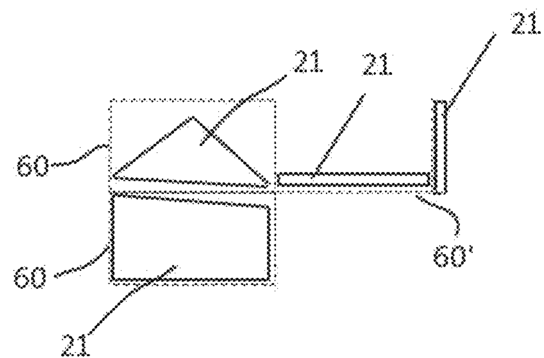
FIG. 6 illustrates a schematic diagram of a front view of FIG. 5.

As shown in FIG. 6, in the present implementation manner, determining the bounding box 60 of the virtual resource 20 may be implemented by the following steps: acquiring the geometry 70 where the virtual resource 20 is located, and determining the size of the bounding box 60 according to the integer multiple of the size of the geometry 70 by way of rounding. The arrangement of the bounding box 60 provided by the above implementation manner may effectively ignore an error during intersection judgment caused by the conventional arrangement of the bounding box 60 due to the problem that the virtual resource 20 is no longer consistent with the size of the built grid after being scaled due to the art needs when constructing a building. A triangular sub-model 21 and a rectangle-like sub-model 21 in FIG. 6 are not connected because of the art needs. However, since a bounding box 60 of the expanded triangular sub-model 21 and a bounding box 60 of the rectangle-like sub-model 21 are adjacent, it is accurately determined that the two sub-models 21 are adjacent. Moreover, when the virtual resource 20 is small in the coordinate axis of a certain game scene, it will be 0 after rounding, so that the influence of the axial direction can be ignored. For example, a bounding box 60' in FIG. 6 ignores the influence of a Y axis.

In other implementation manners, the size of the bounding box 60 may also be determined according to other criteria, for example, the bounding box 60 is arranged in close proximity to the enclosed object.

In the present implementation manner, the remote weapon 50 is a weapon 50 that attacks a target by shooting or throwing. In other implementation manners, the remote weapon 50 may also be customized according to a user or set according to the definition of a game developer. For example, the remote weapon 50 may be a firearm, a dart, a grenade, a bow, or the like. In the present implementation manner, the close-in weapon 50 is a weapon 50 that attacks a target by contact. In other implementation manners, the close-in weapon 50 may also be customized according to a user or set according to the definition of a game developer. For example, the close-in weapon 50 may be a stick, a hoe, a sword, and the like. It is to be noted that the expression forms of the remote weapon 50 and the close-in weapon 50 in the present implementation manner are not specifically limited.

At step S102, when it is detected that the virtual resource 20 is attacked by the virtual object 10, the attacked virtual resource 20 is determined as a first virtual resource 30 to be disassembled.

In the present implementation manner, when the currently used weapon 50 intersects the virtual resource 20 by the preset detection method mentioned in the above implementation manner, it is determined that the currently attacked virtual resource 20 is the first virtual resource 30 to be disassembled, that is, only when being attacked currently, the virtual resource is determined as the first virtual resource 30 to be disassembled, as shown in FIG. 4. In other implementation manners, when it is determined that the currently used weapon 50 intersects the virtual resource 20, it is detected whether a time interval between two adjacent virtual resources 20 being attacked exceeds a preset time difference, and when the preset time difference is exceeded, it is determined that the virtual resource 20 that is attacked posteriorly is the first virtual resource 30 to be disassembled. In other implementation manners, when it is determined that the currently used weapon 50 collides with the virtual resource 20, the new attacked virtual resource 20 is not detected within the preset time interval, so it is determined that all virtual resources 20 attacked previously are the first virtual resource 30 to be disassembled.

Further, after the attacked virtual character 10 is determined as the first virtual resource 30 to be disassembled, the first virtual resource 30 to be disassembled is visually marked. For example, the transparency, color, etc. of the first virtual resource 30 to be disassembled is changed. By the way provided by the present implementation manner, the user is convenient to identify the first virtual resource 30 to be disassembled, thereby providing the user experience.

In the present implementation manner, the first virtual resource 30 to be disassembled is a reconfigurable virtual resource, where the reconfigurable virtual resource includes an existing resource and a new resource. The existing resource refers to a virtual resource 20 that is included in the game scene, such as a virtual resource 20 such as a house or a vehicle that already exists when the game scene is generated. The new resource refers to the virtual resource 20 construed by the virtual object in the game scene according to a control instruction—such as a house or a step constructed in the game scene by controlling the virtual character by touching a virtual control on the display interface of the mobile terminal by the user. The first virtual resource 30 to be disassembled is a basic unit constituting different scene models in the game scene, for example, the basic unit of a vehicle model of the game scene is the whole vehicle model, and the basic unit of a house model in the game scene is a vertical model, a horizontal model, an inclination model, and a cylindrical model.

At step S103, the first virtual resource 30 to be disassembled, which satisfies a preset condition, is removed from the game scene.

Specifically, the virtual resource 20 in the game scene is configured as a static living body having a blood volume attribute. The virtual resource 20 may be attacked and destroyed. In the present implementation manner, the preset condition is that the blood volume value corresponding to the virtual resource 20 is detected to be zero.

As shown in FIG. 4, a status identifier 90 associated with the virtual resource 20 is displayed in the GUI, the status identifier 90 identifying a material type and a current blood volume used by the virtual resource 20, and the material type including: wood, stone and iron materials. The status identifier 90 is displayed in a preset shape at a preset display position of the virtual resource 20 associated with the status identifier 90. In the present implementation manner, the preset shape is a strip shape. In other implementation manners, the shape may be a ring shape or other shapes, which will not be specifically limited herein. In the present implementation manner, the preset display position is within a range displayed by the virtual resource 20.

Further, the status indicator 90 controls the change of the blood volume at a preset speed. In the present implementation manner, the preset speed is associated with the material of the virtual resource 20 corresponding to the status identifier 90. For example, when it is detected that the virtual character attacks the virtual resource 20 made of stone, the blood volume is controlled to decrease by a change speed that is 5 times a basic speed; and when it is detected that the virtual character attacks the virtual resource 20 made of wood, the blood volume is controlled to decrease by a change speed that is 2 times the basic speed.

In other implementation manners, the preset condition may be other conditions that are designed according to the developer of the game or a condition customized by the game player. When it is detected that the conditions are satisfied, the first virtual resource 30 to be disassembled, which satisfies the preset condition, is controlled to be removed from the game scene. The removal may be implemented by setting the first virtual resource 30 to be disassembled as a transparent attribute, and may be implemented by deleting a model of the first virtual resource 30 to be disassembled in the game space. Of course, the purpose of removal may be implemented in other ways. It is to be noted that the way for removing the first virtual resource 30 to be disassembled is not specifically limited.

Figure 7:
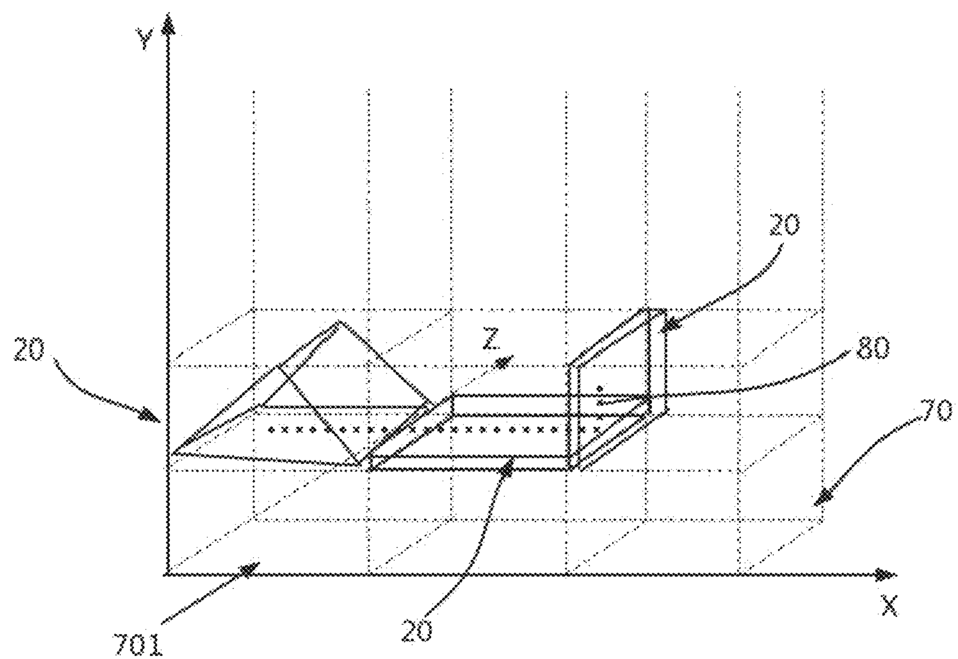
FIG. 7 illustrates a schematic diagram of disassembling a first virtual resource to be disassembled according to an embodiment of the present disclosure.

Referring to FIG. 5 and FIG. 7, for example, the sub-model 21 in FIG. 5 is determined as the first virtual resource 30 to be disassembled. When the blood volume of the first virtual resource 30 to be disassembled is detected to be zero, the sub-model 21 is controlled to be disassembled, as shown in FIG. 7.

By the above implementation manner, the game scene is meshed and split, so that the model of the virtual resource 20 in the game scene may be quickly generated by alignment or eliminated, which improves the speed and precision of image processing, and avoids rough pictures caused by non-alignment of models during the existing model rendering generation or complex operations for model alignment. On the basis of this, in order to facilitate the user to disassemble the virtual resource 20, the virtual resource 20 is classified. By detecting the orientation of the virtual character and the weapon 50 currently used by the virtual character, it is determined whether the virtual resource 20 faced by the virtual character can be disassembled, which can effectively avoid unnecessary graphics processing operations.

Figure 2:
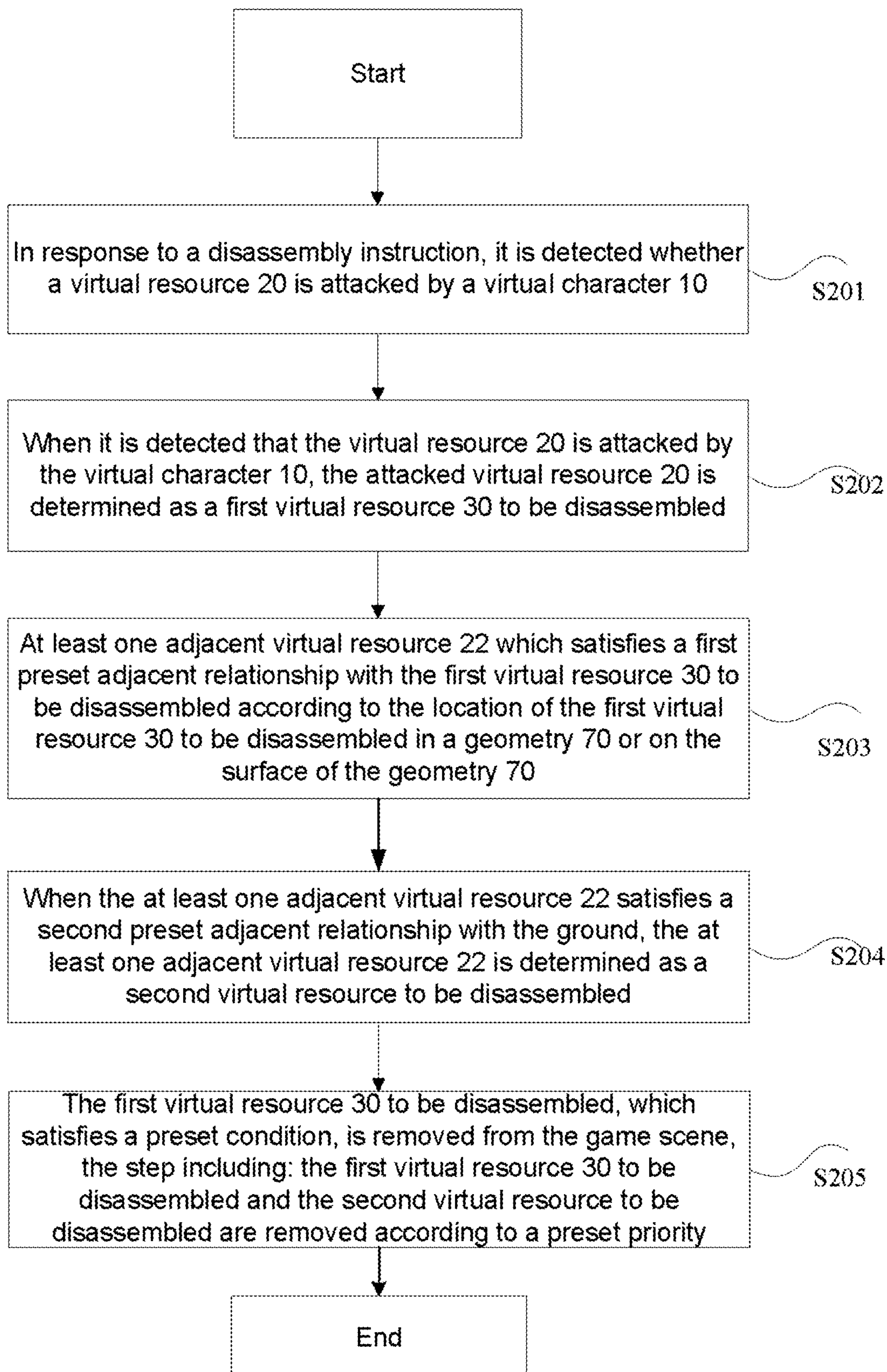
FIG. 2 illustrates a flowchart of a illustrates according to another embodiment of the present disclosure.

FIG. 2 is a processing method for a virtual resource in a game scene described and disclosed according to an optional embodiment. In the present implementation manner, a processing method 200 for a virtual resource in a game scene is illustrated by different examples. The processing method for a virtual resource in a game scene provided in the present implementation manner is performed on a mobile terminal. The mobile terminal may be any terminal device such as a computer, a tablet computer, or an electronic device. A software application is executed on a processor of the mobile terminal, a GUI is obtained by rendering on a touch display of the mobile terminal, the content displayed by the GUI at least partially includes a local or global game scene, and the game scene includes a game image and at least one virtual character 10. The respective steps in the present embodiment may be performed simultaneously with each other or sequentially.

The respective steps in the present embodiment may be subsequently and automatically performed after being triggered, or special steps may be performed according to a user-specific input operation.

At step S201, in response to a disassembly instruction, it is detected whether a virtual resource 20 is attacked by a virtual object 10.

At step S202, when it is detected that the virtual resource 20 is attacked by the virtual object 10, the attacked virtual resource 20 is determined as a first virtual resource 30 to be disassembled.

At step S203, acquiring, according to the location of the first virtual resource 30 to be disassembled in the interconnected virtual geometries 70 or on the surface of the interconnected virtual geometries 70, at least one adjacent virtual resource 22 which satisfies a first preset adjacent relationship with the first virtual resource 30 to be disassembled.

At step S204, when the at least one adjacent virtual resource 22 satisfies a second preset adjacent relationship with the ground, determining the at least one adjacent virtual resource 22 as a second virtual resource to be disassembled.

At step S205, the first virtual resource 30 to be disassembled, which satisfies a preset condition, is removed from the game scene, the step including: the first virtual resource 30 to be disassembled and the second virtual resource to be disassembled are removed according to a preset priority.

By the above implementation manner, after the first virtual resource 30 to be disassembled is determined, the second virtual resource to be disassembled, which satisfies the condition, is automatically determined according to the preset adjacent relationship without the step of repeatedly detecting the attack of the virtual character 10 to the virtual resource 20 and determining the first virtual resource 30 to be disassembled, thus reducing the occupation of system data processing resources. Based on this mode, after disassembling the first virtual resource 30 to be disassembled, the second virtual resource to be disassembled is disassembled inter-connectively, thereby achieving the effect of conforming to building collapse in the real world, and improving the game experience of the user.

Each step in the present exemplary embodiment will be further described below.

The content of steps S201 to S202 is similar to the content of steps S101 and S102 described above, and therefore will not be described herein.

At step S203, acquiring, according to the location of the first virtual resource 30 to be disassembled in the interconnected virtual geometries 70 or on the surface of the interconnected virtual geometries 70, at least one adjacent virtual resource 22 which satisfies a first preset adjacent relationship with the first virtual resource 30 to be disassembled.

The first preset adjacent relationship includes a direct adjacent relationship and an indirect adjacent relationship. The direct adjacent relationship means that two virtual resources 20 have a common edge, or one face of one virtual resource 20 is connected to the surface of the other virtual resource 20, or one point of one virtual resource 20 is connected to the surface of the other virtual resource 20. For example, the virtual resource 20 is a horizontal model. When two horizontal models are juxtaposed together and the side faces of the two horizontal models are attached together, the two horizontal models are considered to be directly adjacent. In the case where the virtual resource 20 is a house model, when one of the houses is built on the side face or top surface of the other house, the side walls of the two houses are attached together or the roof of one house is attached to the bottom surface of the other house, and it is considered that the two houses are directly adjacent. The indirect adjacent relationship means that the two virtual resources 20 are the same virtual resource 20 having a direct relationship. For example, a third horizontal model exists between the first horizontal model and the second horizontal model, and two opposite side faces of the third horizontal model are directly adjacent to the first horizontal model and the second horizontal model, respectively, so it is determined that there is an indirect adjacent relationship between the first horizontal model and the second horizontal model. For example, as shown in FIG. 6, the triangular model 21 is directly connected to the horizontal model 21, the horizontal model 21 is directly connected to the vertical model 21, and the triangular model 21 is indirectly connected to the vertical model 21.

The space of the game scene is divided into a plurality of interconnected virtual geometries 70. The interconnected virtual geometries 70 are virtual blocks defined by a coordinate system for constituting a space of the entire game scene, and each of the interconnected virtual geometries 70 has corresponding coordinate value information. The interconnected virtual geometries 70 may be a rectangular parallelepiped, a cube, a parallelepiped, a honeycomb, etc. It can be understood that the interconnected virtual geometries 70 may be spliced together to form a space for the entire game scene. The virtual resource 20 includes at least one sub-model 21, where the virtual resource 20 may be divided into a standard component model and an independent component model according to the relationship between the sub-models 21 and the interconnected virtual geometries 70. The standard component model is arranged on the surface of the interconnected virtual geometries 70, where the surface of the interconnected virtual geometries 70 includes an outer surface and an inner section. For example, the house model in the game scene is a standard component model, the house may be composed of multiple sub-models, the sub-models of the house are respectively arranged on the surfaces of different geometries to be spliced into a complete house, as shown in FIG. 5. The independent component model is arranged on the surface of the interconnected virtual geometries interconnected virtual geometries or inside the interconnected virtual geometries 70. For example, trees, sunshades, small bridges, sofas and vehicles in the game scene are independent component models.

In the present implementation manner, step S203 includes the steps as follows.

At step S2031, a type of the first virtual resource 30 to be disassembled is acquired.

In the present implementation manner, the type of the virtual resource 20 in the game scene is preset and stored in a type data table in which virtual resource coordinates and virtual resource types are stored. The corresponding virtual resource type in the type data table is determined by acquiring coordinate values of the virtual resource 20.

In other implementation manners, the type of the virtual resource 20 may also be determined by other ways.

At step S2032, a first preset adjacent relationship detection method corresponding to the type is determined according to the type of the first virtual resource 30 to be disassembled.

As shown in FIG. 6, in the present implementation manner, the sub-model 21 of the house is the first virtual resource 30 to be disassembled. When the first virtual resource 30 to be disassembled is a standard component model, the first preset adjacent relationship detection method is a bounding box 60 detection method. Specifically, the interconnected virtual geometries 70 where the virtual resource 20 is located is acquired, and the size of the bounding box 60 is determined according to the integer multiple of the size of the interconnected virtual geometries 70 by way of rounding. The size of the side rectangle of the bounding box 60 as shown in FIG. 6 conforms to the size of the side rectangle of the interconnected virtual geometries 70 in FIG. 5. The purpose of rounding is that: since standard component models usually have thicknesses, such as walls, etc., after the rounding operation, the thickness influence of the standard component model such as a wall and a column can be ignored, and a gap between standard component models designed due to the art can be ignored.

In other implementation manners, when the first virtual resource 30 to be disassembled is a standard component model, the first preset adjacent relationship detection method is a physical engine detection method. With such an implementation manner, it is possible to avoid the situation that models not adjacent actually are determined to be adjacent due to a detection fault caused by inaccurate description of the size of the component model by the bounding box 60.

When the first virtual resource 30 to be disassembled is an independent component model, the first preset adjacent relationship detection method is a physical collision detection method. Since there are some furniture and accessories in and out of the room, there are tens of thousands of models in the whole scene. Detection using the bounding box 60 will result in very low detection efficiency. By the above implementation manner, for the independent component models such as trees, sunshades, small bridges, sofas, and vehicles, these independent component models may be disassembled by attack, but are usually not placed on the surface of the interconnected virtual geometries 70. Therefore, a physical system is used to judge whether colliders of other virtual resources 20 are connected to colliders of the independent component models. The error brought by a building rule in the determination of a virtual resource 20 position relationship in the game scene spliced from the interconnected virtual geometries 70 is effectively solved.

At step S2033, an adjacent virtual resource 22 is determined according to the corresponding first preset adjacent relationship detection method.

Figure 8:
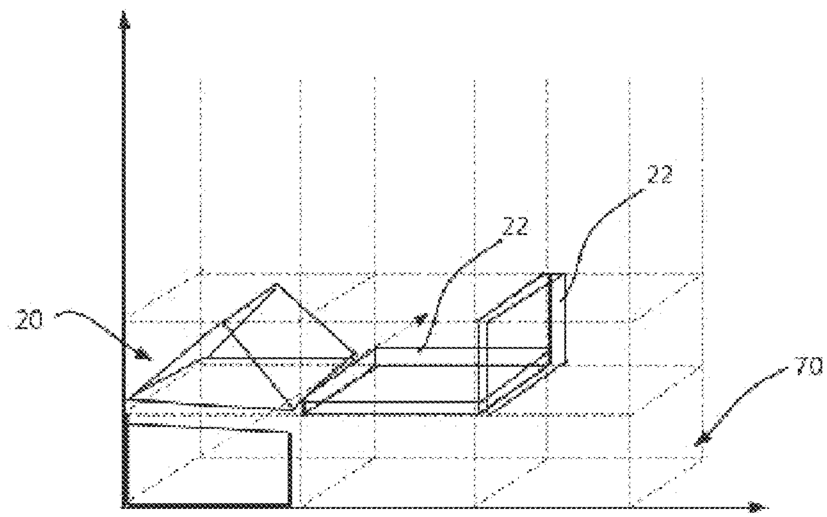
FIG. 8 illustrates a schematic diagram of determining adjacent resources according to an embodiment of the present disclosure.

It is to be noted that the number of adjacent virtual resources 22 that meet the first preset adjacent relationship with the first virtual resource 30 to be disassembled is at least one. For example, as shown in FIG. 8, a horizontal model is built on the side surface of a building model 20, and a vertical model is built on the side face of the horizontal model. Then, when the building model is determined as the first virtual model to be disassembled, the horizontal model directly adjacent to the first virtual model to be disassembled, and the vertical model indirectly adjacent to the first virtual model to be disassembled but directly adjacent to the horizontal model are adjacent virtual resources 22.

By the above implementation manner, the type of the first virtual resource 30 to be disassembled is determined without an adjacent relationship judgment method, which can effectively reduce the amount of data calculation and improve the operation efficiency.

At step S204, when the at least one adjacent virtual resource 22 satisfies a second preset adjacent relationship with the ground, determining the at least one adjacent virtual resource as a second virtual resource 22 to be disassembled.

In the present implementation manner, the second preset adjacent relationship means that the two virtual resources 20 do not satisfy the first preset adjacent relationship, where the content of the first preset adjacent relationship is the same as detailed above, and therefore will not be described herein. In the present implementation manner, the virtual resource 20 in the adjacent resource that does not satisfy the direct adjacent relationship or the indirect adjacent relationship with the ground is determined as the second virtual resource to be disassembled.

In other implementation manners, the second preset adjacent relationship refers to the absence of a path 80 in the two virtual resources 20, where the path 80 is established on the basis of the model corresponding to the virtual resource 20. For example, as shown in FIG. 7, the path 80 passes through three adjacent sub-models 21, but the path 80 cannot be established with an XY plane formed by XY axes. At this time, the three sub-models 21 and the XY plane are considered to satisfy the second preset adjacent relationship.

In the present implementation manner, determining the presence of a path 80 in the two virtual resources 20 may be implemented as follows.

At step 2041, a collider of the first virtual resource 20 is acquired. Specifically, the first virtual resource 20 includes at least one sub-model 21, and the collider of the first virtual resource 20 is a sub-collider that acquires at least one sub-model 21.

At step 2041, an expanded collider is generated according to the sub-collider, it is detected whether it collides with the second virtual resource 20 according to the expanded collider, and it is determined that a path 80 exists between the first virtual resource 20 and the second virtual resource 20 if the expanded collider collides with the second virtual resource 20. Specifically, the position of the sub-collider, the size of the sub-collider and a world rotation matrix are acquired, and a new collider is generated at the position of the sub-collider according to the information. In the present implementation manner, the new collider is a box collider. The new collider is expanded to a preset value to generate an expanded collider, and collision detection is performed by using the expanded collider. For example, the preset value is 5.5 cm, or 1.1 times the bounding box of the new collider. In the present implementation manner, when detecting whether the virtual resource 20 and the ground have a path 80, the step further includes: collision detection is performed by using the expanded collider to obtain all adjacent colliders adjacent to the expanded collider, if there is no virtual resource 20 model in the adjacent collider, it is considered that the adjacent collider is a ground collider, and it is further determined that the virtual resource 20 and the ground have a path 80.

In the above implementation manner, a new collider with a rigid body is generated for the collider to ensure the effectiveness of collision detection, and meanwhile, by expanding the collider, the situation that these adjacent colliders cannot be detected due to non-direct contact between models caused by an error of construction of the virtual resource 20 model is avoided.

In step S205, the first virtual resource 30 to be disassembled, which satisfies a preset condition, is removed from the game scene.

Specifically, the first virtual resource 30 to be disassembled and the second virtual resource to be disassembled are removed according to a preset priority. The setting of the preset priority may be the default setting of the developer of the game, or may be the setting by the user in corresponding options of the setting interface of a game program. In the present implementation manner, the first virtual resource 30 to be disassembled and the second virtual resource to be disassembled are controlled to be removed in sequence according to the preset priority. In other implementation manners, the first virtual resource 30 to be disassembled and the second virtual resource to be disassembled may be removed simultaneously.

The virtual resource 20 in the game scene is configured as a static living body having a blood volume attribute. The virtual resource 20 may be attacked and destroyed. In the present implementation manner, the preset condition is that the blood volume value corresponding to the virtual resource 20 is detected to be zero.

In the present implementation manner, the preset priority may be determined by the following manners.

At step S2051, the first virtual resource 30 to be disassembled is used as a first priority.

At step S2052, a priority value of the second virtual resource to be disassembled is set according to an adjacent level between the first virtual resource 30 to be disassembled and the second virtual resource to be disassembled, the priority number being proportional to the adjacent level.

Specifically, in the present implementation manner, in step S2052, the adjacent stage number is determined by the number of adjacent resources between the second virtual resource to be disassembled and the first virtual resource 30 to be disassembled. In the present implementation manner, the second virtual resource to be disassembled of which the priority is to be confirmed is used as a starting point, the first virtual resource 30 to be disassembled is used as an end point, all the paths from the starting point to the end point are acquired, the number of adjacent resources passing through each path is calculated, and the value of the minimum number of adjacent resources is determined as the priority of the second virtual resource to be disassembled of which the priority is to be confirmed. It is to be noted that the manner of determining the path is not specifically limited, and different priorities of the second virtual resource to be disassembled of which the priority is to be confirmed may be the same.

In other implementation manners, the adjacent stage number is determined by a level interval in which the second virtual resource to be disassembled of which the priority is to be confirmed. Specifically, the second virtual resource to be disassembled of which the priority is to be confirmed is used as a starting point, a preset distance R is used as an interval, and N level layers are arranged in the space, where each level layer may be determined by the scene coordinate system of the game, or may be determined in other ways. When determining the priority of the second virtual resource to be disassembled of which the priority is to be confirmed, position information of the second virtual resource to be disassembled of which the priority is to be confirmed is acquired, the position information of the second virtual resource to be disassembled of which the priority is to be confirmed is compared with position layer of the level layer to determine the level layer where the second virtual resource to be disassembled of which the priority is to be confirmed is located, and a level corresponding to the level layer is used as the priority of the second virtual resource to be disassembled of which the priority is to be confirmed. It is to be noted that there may be multiple adjacent resources in each level layer.

In other implementation manners, the adjacent stage number is confirmed by a preset algorithm and an adjacent table of the second virtual resource to be disassembled of which the priority is to be confirmed. Specifically, an initial adjacent list of the game scene is acquired, and according to a control instruction input by the user, the adjacent list associated with the virtual resource 20 corresponding to the control instruction is updated. When the first virtual resource 30 to be disassembled is determined, a depth priority algorithm is used to obtain a connected component set where the adjacent resources of the first virtual resource 30 to be disassembled are located, and each sub-connected component of the connected component set having no grounded object is selected, and the priority of each node in each sub-connected component is determined by breadth first, where each node represents the virtual resource 20 in the game scene.

It is to be noted that the second virtual resource to be disassembled of which the priority is to be confirmed may include multiple sub-virtual resources 20. In the present implementation manner, the above-mentioned determination of the priority of the second virtual resource to be disassembled of which the priority is to be confirmed may be: determining the priority of the sub-virtual resource 20 in the second virtual resource to be disassembled, and removing the first virtual resource 30 to be disassembled and the sub-virtual resource 20 according to the priority of the sub-virtual resource 20. In other implementation manners, the above-mentioned determination of the priority of the second virtual resource to be disassembled of which the priority is to be confirmed may be: determining the corresponding highest priority of the sub-virtual resource 20 in the second virtual resource to be disassembled, and removing the first virtual resource 30 to be disassembled and the second virtual resource to be disassembled according to the priority.

Figure 3:
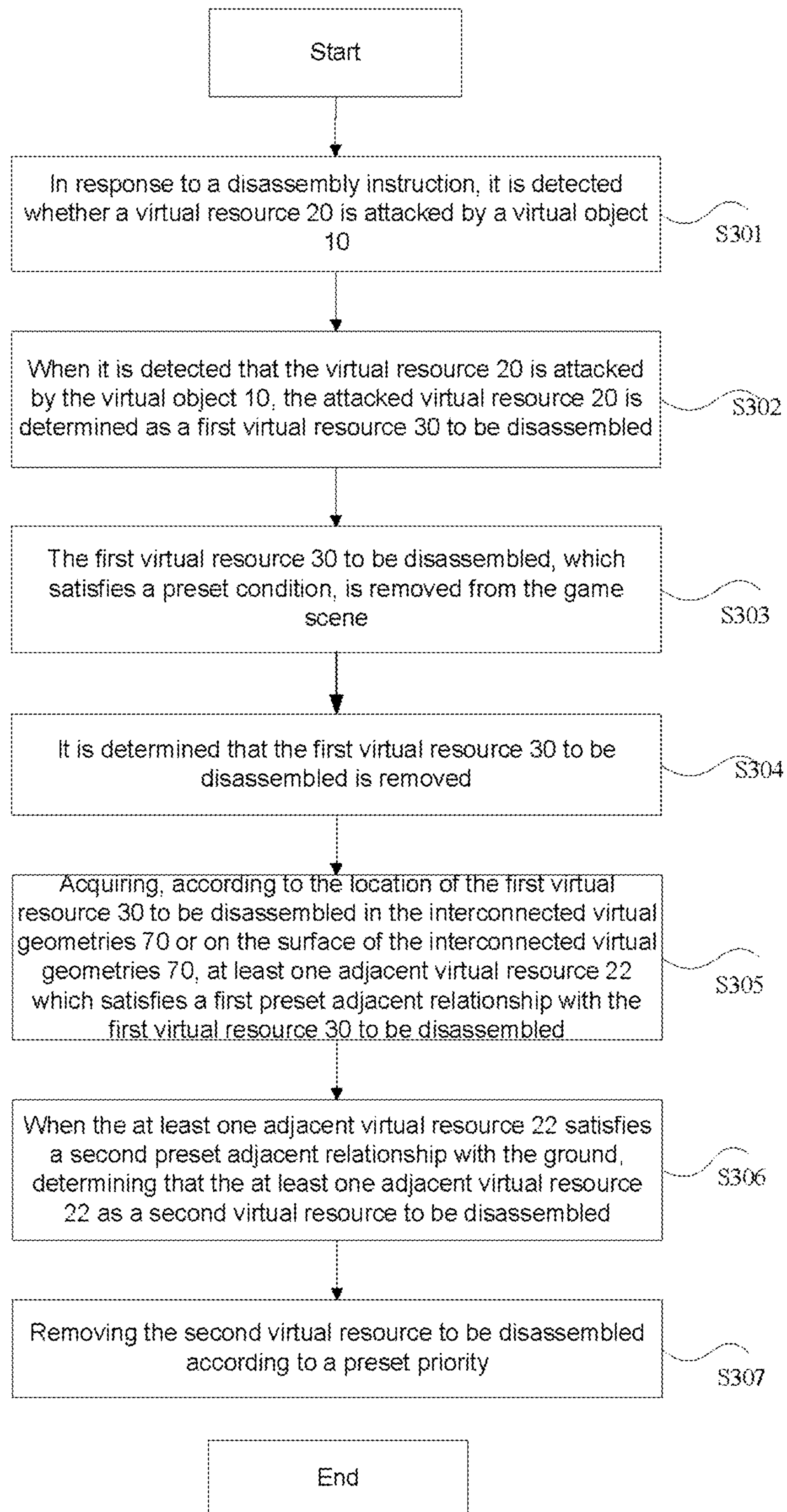
FIG. 3 illustrates a flowchart of a virtual resource processing method in a game scene according to another embodiment of the present disclosure.

FIG. 3 is a virtual resource processing method in a game scene described and disclosed according to an optional embodiment. In the present implementation manner, a processing method 300 for a virtual resource in a game scene is illustrated by different examples. The processing method for a virtual resource in a game scene provided in the present implementation manner is performed on a mobile terminal. The mobile terminal may be any terminal device such as a computer, a tablet computer, or an electronic device. A software application is executed on a processor of the mobile terminal, a GUI is obtained by rendering on a touch display of the mobile terminal, the content displayed by the GUI at least partially includes a local or global game scene, and the game scene includes a game image and at least one virtual character 10. The respective steps in the present embodiment may be performed simultaneously with each other or sequentially.

A virtual resource processing method in a game scene provided in the present implementation manner includes the following steps.

At step S301, in response to a disassembly instruction, detecting whether a virtual resource 20 is attacked by a virtual character 10.

At step S302, when it is detected that the virtual resource 20 is attacked by the virtual object 10, the attacked virtual resource 20 is determined as a first virtual resource 30 to be disassembled.

At step S303, the first virtual resource 30 to be disassembled, which satisfies a preset condition, is removed from the game scene.

At step S304, determining that the first virtual resource 30 to be disassembled is removed.

At step S305, Acquiring, according to the location of the first virtual resource 30 to be disassembled in the interconnected virtual geometries 70 or on the surface of the interconnected virtual geometries 70, at least one adjacent virtual resource 22 which satisfies a first preset adjacent relationship with the first virtual resource 30 to be disassembled.

At step S306, when the at least one adjacent virtual resource 22 satisfies a second preset adjacent relationship with the ground, determining the at least one adjacent virtual resource 22 as a second virtual resource to be disassembled.

At step S307, the second virtual resource to be disassembled is removed according to a preset priority.

Specifically, steps S301 to S303 are similar to steps S101 to S103 in the foregoing implementation manner, and steps S305 to S306 are similar to steps S203 to S204 in the foregoing content, and therefore, the descriptions thereof are omitted herein. Regarding step S307, the related content regarding the priority is similar to the related part in the foregoing content, and therefore, the descriptions thereof are omitted herein. The difference between the present embodiment and the foregoing embodiment is that the step of determining the second virtual resource to be disassembled is different. In the present embodiment, after determining that the first virtual resource 30 to be disassembled is disassembled, the calculation of the adjacent virtual resources 22 which satisfy the condition and the second virtual resource to be disassembled which satisfies the condition in the adjacent virtual resources 22 is triggered.

By the above implementation manner, after determining that the first virtual resource 30 to be disassembled is disassembled, the adjacent virtual resource 22 which satisfies the first preset adjacent relationship with the first virtual resource 30 to be disassembled is calculated, and the second virtual resource to be disassembled is further determined. In this way, the number of data calculations can be effectively reduced, and the calculation of the second virtual resource to be disassembled every time the first virtual resource 30 to be disassembled is determined is avoided.

Figure 9:
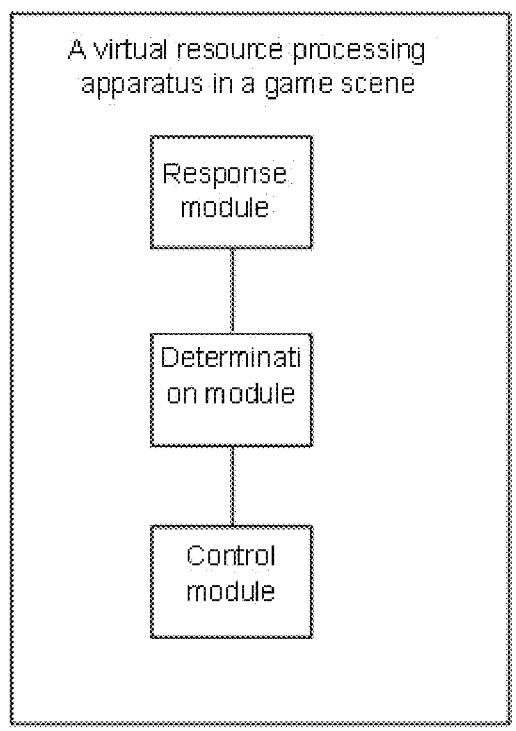
FIG. 9 illustrates a composition diagram of a processing apparatus according to an embodiment of the present disclosure.

As shown in FIG. 9, an exemplary embodiment further discloses a virtual resource processing apparatus in a game scene. The apparatus includes: a response module, a determination module and a control module.

The response module is configured to detect, in response to a disassembly instruction, whether a virtual resource 20 is attacked by a virtual character 10.

The determination module is configured to determine, when it is detected that the virtual resource 20 is attacked by the virtual character 10, the attacked virtual resource 20 as a first virtual resource 30 to be disassembled.

The control module is configured to remove, when the first virtual resource to be disassembled satisfies a preset condition, the first virtual resource to be disassembled from the game scene.

Specific details of various module units in the above embodiment have been described in detail in the corresponding processing method for a virtual resource in a game scene. In addition, it can be understood that the processing apparatus for a virtual resource in a game scene further includes other unit modules corresponding to those in the processing method for a virtual resource in a game scene. Therefore, detail descriptions are omitted herein.

It is to be noted that although several modules or units of the device for action execution are mentioned in the above detailed description, such division is not mandatory. In fact, according to the implementation manners of the disclosure, the features and functions of two or more modules or units described above may be embodied in one module or unit. Conversely, the features and functions of one module or unit described above may be further divided into multiple modules or units and embodied.

Figure 10:
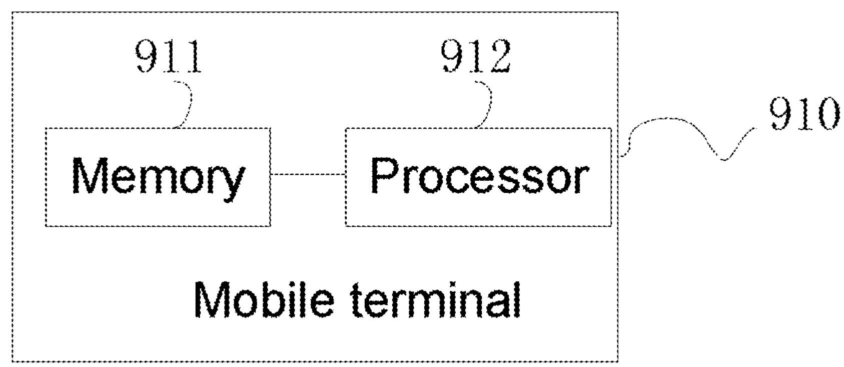
FIG. 10 illustrates a composition diagram of a mobile terminal according to an embodiment of the present disclosure.

FIG. 10 is a structure schematic diagram of a mobile terminal according to an embodiment of the present disclosure. As shown in FIG. 10, the electronic device 910 of the present embodiment includes: a memory 911 and a processor 912. The memory 911 and the processor 912 may be connected by a bus. A software application is executed on a processor of a terminal, and rendering is performed on a display device of the terminal to obtain a GUI.

The processor 912 is provided.

The memory 911 is configured to store an executable instruction of the processor.

The processor is configured to execute the executable instruction to implement the following steps:

In response to a disassembly instruction, it is detected whether a virtual resource 20 is attacked by a virtual object 10.

When it is detected that the virtual resource 20 is attacked by the virtual object 10, the attacked virtual resource 20 is determined as a first virtual resource 30 to be disassembled.

The first virtual resource 30 to be disassembled, which satisfies a preset condition, is removed from the game scene.

In an optional embodiment, the space of the game scene may be divided into plurality of interconnected virtual geometries 70, and the virtual resource 20 is built on at least one of surfaces of the interconnected virtual geometries 70, or the virtual resource is built on 20 at least one of inner sections of the interconnected virtual geometries 70.

In an optional embodiment, after the step of determining the attacked virtual resource 20 as a first virtual resource 30 to be disassembled, the method further includes: acquiring, according to a location of the first virtual resource 30 to be disassembled in the interconnected virtual geometries 70 or on the surface of the interconnected virtual geometries 70, at least one adjacent virtual resource 22 which satisfies a first preset adjacent relationship with the first virtual resource 20 to be disassembled; and when the at least one adjacent virtual resource 22 satisfies a second preset adjacent relationship with the ground in the game scene, determining the at least one adjacent virtual resource 22 as a second virtual resource to be disassembled.

In an optional embodiment, the step that the first virtual resource 30 to be disassembled, which satisfies a preset condition, is removed from the game scene includes: the first virtual resource 30 to be disassembled and the second virtual resource to be disassembled are removed according to a preset priority.

In an optional embodiment, a step of setting the preset priority includes: setting the first virtual resource 30 to be disassembled as a first priority; and setting a priority value of the second virtual resource to be disassembled according to an adjacent level between the first virtual resource to be disassembled and the second virtual resource to be disassembled, wherein the priority value is proportional to the adjacent level.

In an optional embodiment, the method further includes: determining that the first virtual resource 30 to be disassembled is removed; acquiring, according to a location of the first virtual resource 30 to be disassembled in the interconnected virtual geometries 70 or on the surface of the interconnected virtual geometries 70, at least one adjacent virtual resource 22 which satisfies a first preset adjacent relationship with the first virtual resource 30 to be disassembled; and when the at least one adjacent virtual resource 22 satisfies a second preset adjacent relationship with the ground in the game scene, determining the at least one adjacent virtual resource 22 as a second virtual resource to be disassembled.

In an optional embodiment, the step of detecting whether the virtual resource 20 is attacked by the virtual character 10 further includes: a weapon type of a weapon currently used by the virtual character 10 is acquired; and a preset detection method corresponding to the weapon type is acquired according to the weapon type, and it is detected whether the virtual resource 20 is attacked by the virtual character 10 according to the preset detection method.

In an optional embodiment, the preset detection method includes at least one of the following: when the weapon type is a remote weapon 50, the preset detection method is raycast detection method using a raycast to detect collision; and when the weapon type is a close-in weapon 50, the preset detection method is a collider detection method using a collider to detect collision.

In an optional embodiment, the step of in responding to a disassembly instruction includes: in responding to a touch operation on a preset disassembly instruction control on a GUI the preset disassembly instruction control 40 controlling, according to the touch operation of the user, the virtual character 10 to attack the virtual resource 20.

In an optional embodiment, the method further includes: displaying, in the GUI, a status identifier 90 associated with the virtual resource 20, the status identifier 90 identifying a material type and a current blood volume used by the virtual resource, and the material type comprising: wood, stone and iron materials.

In an optional embodiment, the virtual resource 20 includes existing resources and new resources.

By means of a mobile terminal provided by the present implementation manner, in response to a disassembly instruction input by a user, the virtual resource 20 in a game scene is attacked. When it is detected that the virtual resource 20 is attacked, it is determined that the virtual resource 20 is the first virtual resource 30 to be disassembled. When the first virtual resource 30 to be disassembled satisfies a preset condition, the first virtual resource 30 to be disassembled is removed from the scene. By means of the above implementation manner, a novel user interaction mode is provided. A user may conveniently achieve attacking and removing of the virtual resource 20 in the game scene. The number of interactions between the user and an interaction interface is reduced. The user experience is improved.

In an optional implementation manner, the mobile terminal may further include one or more processors, and a memory resource represented by the memory and configured to store an instruction executable by a processing component, such as an application program. The application program stored in the memory may include one or more modules each corresponding to a set of instructions. In addition, the processing component is configured to execute instructions to perform the above-described virtual resource processing method in a game scene.

The mobile terminal may also include: a power supply component, configured to perform power management on the mobile terminal; a wired or wireless network interface, configured to connect the mobile terminal to a network; and an input output (I/O) interface. The mobile terminal may operate based on an operating system stored in the memory, such as Android, IOS, Windows, Mac OS X, Unix, Linux, FreeBSD, or the like.

Figure 11:
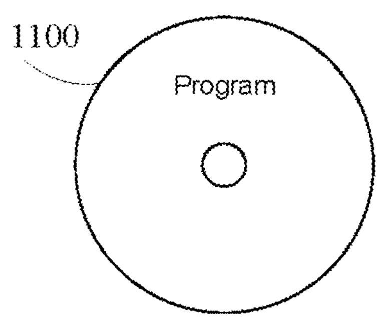
FIG. 11 illustrates a structure schematic diagram of a storage medium according to an embodiment of the present disclosure.

FIG. 11 is a structure schematic diagram of a non-transitory storage medium according to an embodiment of the present disclosure. As shown in FIG. 11, a program product 1100 according to an implementation manner of the present disclosure is described. A computer program is stored thereon. When being executed by a processor, the computer program implements the following steps:

In response to a disassembly instruction, it is detected whether a virtual resource 20 is attacked by a virtual object 10.

When it is detected that the virtual resource 20 is attacked by the virtual object 10, the attacked virtual resource 20 is determined as a first virtual resource 30 to be disassembled.

The first virtual resource 30 to be disassembled, which satisfies a preset condition, is removed from the game scene.

In an optional embodiment, the space of the game scene may be divided into plurality of interconnected virtual geometries 70, and the virtual resource 20 is built on at least one of surfaces of the interconnected virtual geometries 70, or the virtual resource is built on 20 at least one of inner sections of the interconnected virtual geometries 70.

In an optional embodiment, after the step of determining the attacked virtual resource 20 as a first virtual resource 30 to be disassembled, the method further includes: acquiring, according to a location of the first virtual resource 30 to be disassembled in the interconnected virtual geometries 70 or on the surface of the interconnected virtual geometries 70, at least one adjacent virtual resource 22 which satisfies a first preset adjacent relationship with the first virtual resource 20 to be disassembled; and when the at least one adjacent virtual resource 22 satisfies a second preset adjacent relationship with the ground in the game scene, determining the at least one adjacent virtual resource 22 as a second virtual resource to be disassembled.

In an optional embodiment, the step that the first virtual resource 30 to be disassembled, which satisfies a preset condition, is removed from the game scene includes: the first virtual resource 30 to be disassembled and the second virtual resource to be disassembled are removed according to a preset priority.

In an optional embodiment, a step of setting the preset priority includes: setting the first virtual resource 30 to be disassembled as a first priority; and setting a priority value of the second virtual resource to be disassembled according to an adjacent level between the first virtual resource to be disassembled and the second virtual resource to be disassembled, wherein the priority value is proportional to the adjacent level.

In an optional embodiment, the method further includes: determining that the first virtual resource 30 to be disassembled is removed; acquiring, according to a location of the first virtual resource 30 to be disassembled in the interconnected virtual geometries 70 or on the surface of the interconnected virtual geometries 70, at least one adjacent virtual resource 22 which satisfies a first preset adjacent relationship with the first virtual resource 30 to be disassembled; and when the at least one adjacent virtual resource 22 satisfies a second preset adjacent relationship with the ground in the game scene, determining the at least one adjacent virtual resource 22 as a second virtual resource to be disassembled.

In an optional embodiment, the step of detecting whether the virtual resource 20 is attacked by the virtual character 10 further includes: a weapon type of a weapon currently used by the virtual character 10 is acquired; and a preset detection method corresponding to the weapon type is acquired according to the weapon type, and it is detected whether the virtual resource 20 is attacked by the virtual character 10 according to the preset detection method.

In an optional embodiment, the preset detection method includes at least one of the following: when the weapon type is a remote weapon 50, the preset detection method is raycast detection method using a raycast to detect collision; and when the weapon type is a close-in weapon 50, the preset detection method is a collider detection method using a collider to detect collision.

In an optional embodiment, the step of in responding to a disassembly instruction includes: in responding to a touch operation on a preset disassembly instruction control on a GUI the preset disassembly instruction control 40 controlling, according to the touch operation of the user, the virtual character 10 to attack the virtual resource 20.

In an optional embodiment, the method further includes: displaying, in the GUI, a status identifier 90 associated with the virtual resource 20, the status identifier 90 identifying a material type and a current blood volume used by the virtual resource, and the material type comprising: wood, stone and iron materials.

In an optional embodiment, the virtual resource 20 includes existing resources and new resources.

By means of the computer storage medium provided by one embodiment of the present disclosure, in response to a disassembly instruction input by a user, a virtual resource in a game scene is attacked. When it is detected that a virtual resource 20 is attacked, it is determined that the virtual resource 20 is a first virtual resource 30 to be disassembled. When the first virtual resource 30 to be disassembled satisfies a preset condition, the first virtual resource 30 to be disassembled is removed from the scene. By means of the above implementation manner, a novel user interaction mode is provided. A user may conveniently achieve attacking and removing of the virtual resource 20 in the game scene. The number of interactions between the user and an interaction interface is reduced. The user experience is improved.

The computer-readable storage medium may include a data signal that is propagated in a baseband or as part of a carrier, carrying readable program code. Such propagated data signals may take a variety of forms including, but not limited to, electromagnetic signals, optical signals, or any suitable combination of the foregoing. The computer-readable storage medium may send, propagate, or transmit a program for use by or in connection with an instruction execution system, device or apparatus.

Program codes included in the computer-readable storage medium may be transmitted by any suitable medium, including but not limited to wireless, wire, optical cable, radio frequency, etc., or any suitable combination of the foregoing.

Through the description of the above implementation manner, those skilled in the art will readily understand that the example implementation manners described herein may be implemented by software or by software in combination with necessary hardware. Therefore, the technical solution according to the embodiment of the disclosure may be embodied in the form of a software product, which may be stored in a non-volatile storage medium (which may be a CD-ROM, a USB flash drive, a mobile hard disk, etc.) or on a network. A number of instructions are included to cause a computing device (which may be a personal computer, server, electronic device, or network device, etc.) to perform a method in accordance with an embodiment of the disclosure.

Other embodiments of the disclosure will be apparent to those skilled in the art after considering the specification and practicing the disclosure herein. The present application is intended to cover any variations, uses, or adaptations of the disclosure, which are in accordance with the general principles of the disclosure and include common general knowledge or conventional technical means in the art that are not disclosed in the disclosure. The specification and examples are to be regarded as illustrative only, and the true scope and spirit of the disclosure are pointed out by the claims.

It is to be understood that the disclosure is not limited to the accurate structure that have been described and shown in the drawings, and may make various modifications and variations without departing the scope thereof. The scope of the disclosure is limited only by the appended claims.

What is claimed is:

1. A virtual resource processing method in a game scene, the method comprising:

in response to a disassembly instruction, detecting whether the virtual resource is attacked by a virtual character;

in response to detection that the virtual resource is attacked by the virtual character, determining the virtual resource attacked by the virtual character as a first virtual resource to be disassembled; and in response to the first virtual resource to be disassembled satisfying a preset condition, removing the first virtual resource to be disassembled from the game scene;

wherein the step of detecting whether the virtual resource is attacked by the virtual character further comprises:

acquiring a weapon type of a weapon currently used by the virtual character; and acquiring, according to the weapon type, a preset detection method corresponding to the weapon type, and detecting whether the virtual resource is attacked by the virtual character according to the preset detection method.

2. The processing method as claimed in claim 1, wherein a space of the game scene is divided into a plurality of interconnected virtual geometries, and the virtual resource is built on at least one of surfaces of the interconnected virtual geometries, or at least one of inner sections of the interconnected virtual geometries.

3. The processing method as claimed in claim 2, wherein before removing, the first virtual resource to be disassembled from the game scene, the method further comprises:

acquiring, according to a location of the first virtual resource to be disassembled in the interconnected virtual geometries or on the surface of the interconnected virtual geometries, at least one adjacent virtual resource which satisfies a first preset adjacent relationship with the first virtual resource to be disassembled; and in response to the at least one adjacent virtual resource satisfies a second preset adjacent relationship with the ground in the game scene, determining the at least one adjacent virtual resource as a second virtual resource to be disassembled.

4. The processing method as claimed in claim 3, wherein when removing the first virtual resource to be disassembled from the game scene, the method further comprises:

removing, according to a preset priority, the first virtual resource to be disassembled satisfying the preset condition, and the second virtual resource to be disassembled.

5. The processing method as claimed in claim 4, wherein a step of setting the preset priority comprises:

setting the first virtual resource to be disassembled as a first priority; and setting a priority value of the second virtual resource toe disassembled according to an adjacent level between the first virtual resource to be disassembled and the second virtual resource to be disassembled, wherein the priority value is proportional to the adjacent level.

6. The processing method as claimed in claim 2, the method further comprising:

determining that the first virtual resource to be disassembled is removed;

acquiring, according to a location of the first virtual resource to be disassembled in the interconnected virtual geometries or on the surface of the interconnected virtual geometries, at least one adjacent virtual resource which satisfies a first preset adjacent relationship with the first virtual resource to be disassembled; and in response to the at least one adjacent virtual resource satisfies a second preset adjacent relationship with the ground in the game scene, determining the at least one adjacent virtual resource as a second virtual resource to be disassembled.

7. The processing method as claimed in claim 1, wherein the preset detection method comprises at least one of the following:

when the weapon type is a remote weapon, the preset detection method is raycast detection method using a raycast to detect collision; and when the weapon type is a close-in weapon, the preset judgment method is a collider detection method.

8. The processing method as claimed in claim 1, wherein in responding to a disassembly instruction comprises: in responding to a touch operation on a preset disassembly instruction control on a graphical user interface (GUI), the preset disassembly instruction control controlling, according to the touch operation, the virtual character to attack the virtual resource.

9. The processing method as claimed in claim 1, further comprising:

displaying, in the GUI, a status identifier associated with the virtual resource, the status identifier identifying a material type and a current blood volume used by the virtual resource, and the material type comprising: wood, stone and iron materials.

10. The processing method as claimed in claim 1, wherein the virtual resource comprises existing resources and new resources.

11. A mobile terminal, comprising:

a processor, and a memory, configured to store an executable instruction of the processor, wherein the processor is configured to perform the processing method as claimed in claim 1 by executing the executable instruction.

12. A non-transitory storage medium, a computer program being executed by a processor to implement the processing method as claimed in claim 1.

13. The method as claimed in claim 1, wherein the virtual resource is composed of at least one sub-model which is a basic unit constituting the virtual resource.

14. The method as claimed in claim 13, wherein the sub-model is configured to be disassembled in the game scene and is configured to be constructed in the game scene according to a control instruction.

15. The method as claimed in claim 13, wherein determining the virtual resource attacked by the virtual character as the first virtual resource to be disassembled is determining at least one sub-model of the virtual resource attacked by the virtual character as the first resource to be disassembled.

16. The method as claimed in claim 1, wherein the method further comprises:

determining, according a preset adjacent relationship, a second Virtual resource to be disassembled;

disassembling the second virtual resource to be disassembled inter-connectively, after or at the same time the first virtual resource to be disassembled is disassembled.

17. The method as claimed in claim 1, wherein the step of in response to a disassembly instruction further comprises:

associating a physical button of the mobile terminal with the disassembly instruction, and when detecting that the physical button is pressed, controlling the virtual character attack the virtual resource.

18. The method as claimed in claim 1, wherein the step of in response to a disassembly instruction further comprises:

converting an aim point form according to the disassembly instruction, the aim point form is: a visual representation of an aim point.

19. The method as claimed in claim 5, wherein the adjacent level is determined by the number of adjacent resources between the second virtual resource to be disassembled and the first virtual resource to be disassembled.

* * * * *